(12) United States Patent
Hu et al.

(10) Patent No.: US 11,169,105 B2
(45) Date of Patent: Nov. 9, 2021

(54) SYSTEM AND METHOD FOR MONITORING AT LEAST ONE CHARACTERISTIC PROPERTY OF A MULTIPHASE FLUID

(71) Applicant: Commonwealth Scientific and Industrial Research Organisation, Acton (AU)

(72) Inventors: Shenggen Hu, Mt. Ommaney (AU); Michael O'Brien, Bellbowrie (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 6 days.

(21) Appl. No.: 16/628,469

(22) PCT Filed: Jun. 27, 2018

(86) PCT No.: PCT/AU2018/050656
§ 371 (c)(1),
(2) Date: Jan. 3, 2020

(87) PCT Pub. No.: WO2019/006492
PCT Pub. Date: Jan. 10, 2019

(65) Prior Publication Data
US 2020/0124552 A1    Apr. 23, 2020

(30) Foreign Application Priority Data
Jul. 4, 2017  (AU) ................................ 2017902604

(51) Int. Cl.
*G01N 27/02*          (2006.01)
(52) U.S. Cl.
CPC ................................. *G01N 27/026* (2013.01)
(58) Field of Classification Search
CPC .... G01N 27/026; G01N 27/06; G01N 27/416; G01N 33/48707; G01N 2015/0053;
(Continued)

(56) References Cited

U.S. PATENT DOCUMENTS

| 7,106,075 B2 * | 9/2006 | Hu | ..................... G01N 33/2858 |
| | | | 324/698 |
| 7,983,864 B2 * | 7/2011 | Hu | ..................... G01N 33/2823 |
| | | | 702/65 |

(Continued)

FOREIGN PATENT DOCUMENTS

| WO | 2004/077036 A1 | 9/2004 |
| WO | 2015/199659 A1 | 12/2015 |
| WO | WO-2015199659 A1 * | 12/2015 ........... G01N 33/383 |

OTHER PUBLICATIONS

International Search Report and Written Opinion of the International Searching Authority for International Patent Application No. PCT/AU2018/050656 dated Sep. 4, 2018, 11 pages.

(Continued)

*Primary Examiner* — Alesa Allgood
(74) *Attorney, Agent, or Firm* — Merchant & Gould P.C.

(57) ABSTRACT

A system for monitoring at least one characteristic property of a multiphase fluid is disclosed. The system comprises at least one pair of electrodes immersed within a multiphase fluid and defining a sample region located therebetween, signal generating means configured to generate and apply an electrical signal across the at least one pair of electrodes, measuring means configured for measuring an electrical parameter of the multiphase fluid in the sample region, the measured electrical parameter being caused to change in response to a flow of electrical current between the at least one pair of electrodes, and a processor configured to calculate relative impedance data corresponding to a ratio of a magnitude of an electrical impedance of at least one phase constituent of the multiphase fluid within the sample region measured at a first selected frequency point relative to a magnitude of an electrical impedance of at least one other phase constituent measured at a second selected frequency point, wherein the value or degree of variation of the relative (Continued)

impedance data is proportional to at least one characteristic property of the at least one phase constituent of the multi-phase fluid.

20 Claims, 5 Drawing Sheets (58) Field of Classification Search
CPC ............... G01N 33/18; G01N 33/4836; B01L 2300/0645; B01L 3/502715; B01L 2200/0605; B01L 2200/026; B01L 2200/0642

See application file for complete search history.

(56) References Cited

U.S. PATENT DOCUMENTS

| | | | |
|---|---|---|---|
| 2003/0222656 A1 | 12/2003 | Phillips et al. | |
| 2006/0265150 A1* | 11/2006 | Hu | G01N 33/2823 702/50 |
| 2009/0119041 A1* | 5/2009 | Hu | G01N 33/2823 702/65 |
| 2011/0224520 A1* | 9/2011 | Skerl | A61B 5/0535 600/345 |
| 2012/0182030 A1 | 7/2012 | Calciolari et al. | |
| 2013/0265063 A1 | 10/2013 | Cherney et al. | |
| 2014/0077828 A1 | 3/2014 | Gruden et al. | |
| 2014/0116117 A1 | 5/2014 | Joksch | |

OTHER PUBLICATIONS

International-Type Search Report for Australian Patent Application No. 2017902604 dated Apr. 27, 2018, 9 pages.

Hu, S. et al., "Process Monitoring using Electrical Impedance Spectroscopy", ACARP Project C9045 Report, CSIRO Energy Technology, 52 pages (Nov. 2002).

Hu, S. et al., "Process Monitoring for DMC Using EIS Plant-Based Trials", ACARP Project C9045—Stage 2 Report, CSIRO Energy Technology, 58 pages (Mar. 2005).

Hu, S. et al., "On-Line Monitoring and Control of DMC Separation Density and Efficiency", ACARP Project C13058 Final Report, CSIRO Energy Technology, 56 pages (Mar. 2007).

Examination Report for India Patent Application No. 201937052184 dated Sep. 16, 2021, 7 pages.

* cited by examiner (a)

SYSTEM AND METHOD FOR MONITORING AT LEAST ONE CHARACTERISTIC PROPERTY OF A MULTIPHASE FLUID

This application is a National Stage Application of PCT/AU2018/050656, filed 27 Jun. 2018, which claims the benefit of Serial No. 2017902604, filed 4 Jul. 2017 in Australia, and which applications are incorporated herein by reference. To the extent appropriate, a claim of priority is made to each of the above-disclosed applications.

TECHNICAL FIELD

The present invention relates generally to a system and method for monitoring at least one characteristic property of a multiphase fluid.

The invention has been developed primarily for use in on-line monitoring of industrial processes involving multiphase fluids based on the analysis of electrical impedance measurements obtained from the multiphase fluid and will be described hereinafter with reference to this application.

The following discussion of the background to the invention is intended to facilitate an understanding of the invention. However, it should be appreciated that the discussion is not an acknowledgement or admission that any of the material referred to was published, known or part of the common general knowledge in Australia or any other country as at the priority date of any one of the claims of this specification.

BACKGROUND OF INVENTION

In many industrial processes involving multiphase fluid mixtures where the components and mixtures may be stationary, moving in bath or flowing continuously, there is an immediate need for accurate and inexpensive methods and means for monitoring characteristic properties of multiphase fluid mixtures. It is also often desirable that these methods and means have the capability of working on-line with the processes.

For instance, in the dense medium separation of coal and mineral ores, it is desirable to monitor the density of the dense medium or the volumetric fraction of suspended fine dense particles in an aqueous slurry. At present, there are two techniques currently used for measuring the density of dense medium, the first employs a nucleonic gauge and while the second employs a differential pressure cell (DP cell). Nucleonic gauges can be used to measure the density of dense medium. Because of the radioactive nature of the nucleonic sources, there are many Occupational Health and Safety (OHS) issues with respect to their use. The major disadvantage of DP cells is the high maintenance costs associated with the frequent flushing of the tapping points on the main pipe to prevent blockages and loss of signal. Another problem associated with DP cells is the requirement of properly engineered vertical pipe sections. Therefore, there are no simple commercially available on-line monitors capable of monitoring the medium density of slurry mixtures containing water, magnetite, and fine non-magnetite solids.

Froth flotation is a process employed across a number of industries including mineral processing, paper recycling and wastewater treatment industries, for selectively separating hydrophobic materials from hydrophilic materials, thereby concentrating valuable constituents, from their ores or raw materials. Particularly, this froth flotation process is widely used in the coal industry for the separation of fine coal from gangue particles.

Froth flotation typically involves the use of air injection through a slurry that contains water, minerals and gangue particles within a vessel. Dispersed air bubbles attract the hydrophobic valuable minerals and carry them upward to the top of the flotation cell, whereupon they form a froth bed or froth layer which contains and supports pulverized mineral. The froth is then scraped or permitted to flow over the lip of the cell to effect the separation. The thus concentrated mineral bearing froth is collected and further processed to improve the concentration of desired minerals. Use of the froth flotation process therefore improves not only coal production yield but also quality. However, coal flotation processes are often operated without monitoring relevant characteristic properties in the froth phase due to the lack of appropriate sensors. Physiochemical conditions (i.e. froth structure stability, bubble-water interface conditions, solids content and water content) in the froth phase of a flotation process generally change with changes in reagent additions, coal-bubble attachment, aeration rate and froth wash-water rate. These physiochemical conditions can be reflected in measured electrical and dielectric properties, e.g. electrical impedance. Therefore, the monitoring of electrical impedance of a froth phase will provide an additional tool for the on-line monitoring of coal flotation processes.

The inventors previously recognized and reported (Hu and Firth, 2002; International Patent Application no. PCT/AU2004/000187 (Patent Publication No. WO2004/077036), Hu and Firth, 2005) that the on-line measurement of the electrical impedance spectrum (EIS) of slurry mixtures obtained from coal slurries containing water, magnetite, coal and/or sand is a useful technique to measure the medium density or the volumetric fraction of fine magnetite particles in the dense medium, and the measurement of EIS is also useful for monitoring flotation processes. However, these measurements were obtained using an electrical impedance spectrometer over a wide range of frequencies (10 Hz to 1 MHz), which is decidedly slow and costly.

In short, while the on-line measurement of the performance indices for these particular coal processing operations is clearly a prerequisite for achieving effective control of these processes, obtaining the necessary measurements using current on-line techniques is difficult and costly, which invariably has a serious impact on the cost-effectiveness of the technique in practical applications.

The present invention seeks to provide a system and method for monitoring at least one characteristic property of a multiphase fluid, which will overcome or substantially ameliorate at least some of the deficiencies of the prior art, or to at least provide an alternative.

SUMMARY OF INVENTION

According to a first aspect of the present invention there is provided a system for monitoring at least one characteristic property of a multiphase fluid, the system comprising: at least one pair of electrodes immersed within a multiphase fluid and defining a sample region located therebetween; signal generating means configured to generate and apply an electrical signal across the at least one pair of electrodes; measuring means configured for measuring an electrical parameter of the multiphase fluid in the sample region, the measured electrical parameter being caused to change in response to a flow of electrical current between the at least one pair of electrodes; and a processor configured to calculate relative impedance data corresponding to a ratio of a magnitude of an electrical impedance of at least one phase constituent of the multiphase fluid within the sample region measured at a first selected frequency point relative to a magnitude of an electrical impedance of at least one other phase constituent measured at a second selected frequency point, wherein the value of degree of variation of the relative impedance data is proportional to at least one characteristic property of the at least one phase constituent of the multiphase fluid.

According to a second aspect of the present invention there is provided a method for monitoring at least one characteristic property of a multiphase fluid, including the steps of: applying an electrical signal across at least one pair of electrodes immersed within a multiphase fluid and defining a sample region substantially therebetween; measuring an electrical parameter of the multiphase fluid in the sample region, the measured electrical parameter being caused to change in response to a flow of electrical current between the at least one pair of electrodes; and calculating relative impedance data corresponding to a ratio of a magnitude of an electrical impedance of at least one phase constituent of the multiphase fluid within the sample region measured at a first selected frequency point relative to a magnitude of an electrical impedance of at least one other phase constituent measured at a second selected frequency point, wherein the value or degree of variation of the relative impedance data is proportional to at least one characteristic property of the at least one phase constituent of the multiphase fluid.

Other aspects of the invention are also disclosed.

BRIEF DESCRIPTION OF DRAWINGS

Notwithstanding any other forms which may fall within the scope of the present invention, preferred embodiments of the invention will now be described, by way of example only, with reference to the accompanying drawings in which.

DETAILED DESCRIPTION

It is to be understood that the following description is for the purpose of describing particular embodiments only and is not intended to be limiting with respect to the above description.

Previous work by the inventors (Hu and Firth, 2007) demonstrated that when electrical impedance spectrum measurements for a series of water/magnetite slurries having different relative (medium) densities (RD) were obtained using an electrical impedance spectrometer scanned across a wide range of frequencies (10 Hz to 1 MHz), and the electrical impedance measurements subsequently normalized at 100 kHz, the normalized spectrum showed that the resultant curves all intersected at a frequency of 100 kHz; an outcome which is independent of temperature and water conductivity conditions.

Here, the present invention is predicated on the finding that the inventors have unexpectedly since recognised that by using a system comprising an electrical impedance meter equipped with a suitably configured electrode configuration, it is possible to rely on the above frequency of 120 kHz as an upper limit of a much narrower range of frequencies (20 kHz to 120 kHz) within which to obtain electrical impedance magnitude measurements of a multiphase fluid such as a water/magnetite slurry with at least the same degree of accuracy as achieved using an electrical impedance spectrometer to scan a multitude of frequencies (10 Hz to 1 MHz), but in a much faster time at least, and without incurring the expense associated with this particular technique. Moreover, this narrower frequency range (20 kHz to 120 kHz) also has the added benefit that the effect of any surrounding radio-frequency noise is significantly reduced.

Indeed, the use of the electrical impedance meter and the associated method described in more detail below, to obtain electrical impedance magnitude measurements at least one fixed and relatively high frequency point selected within this narrower range of frequencies, ensures that the electrical impedance magnitude measurements can be obtained and repeated quickly over a very short period of time, thereby leading to more accurate data being obtained for fast-flowing multiphase fluids within significantly shorter, near-real time, timeframes.

The following provides a description of a system for use in monitoring a characteristic property of a multiphase fluid, which includes an electrical impedance meter that has been configured with either a two-electrode configuration or a four-electrode configuration.

Electrical Impedance Meter

Two-Electrode Configuration

Figure 1:
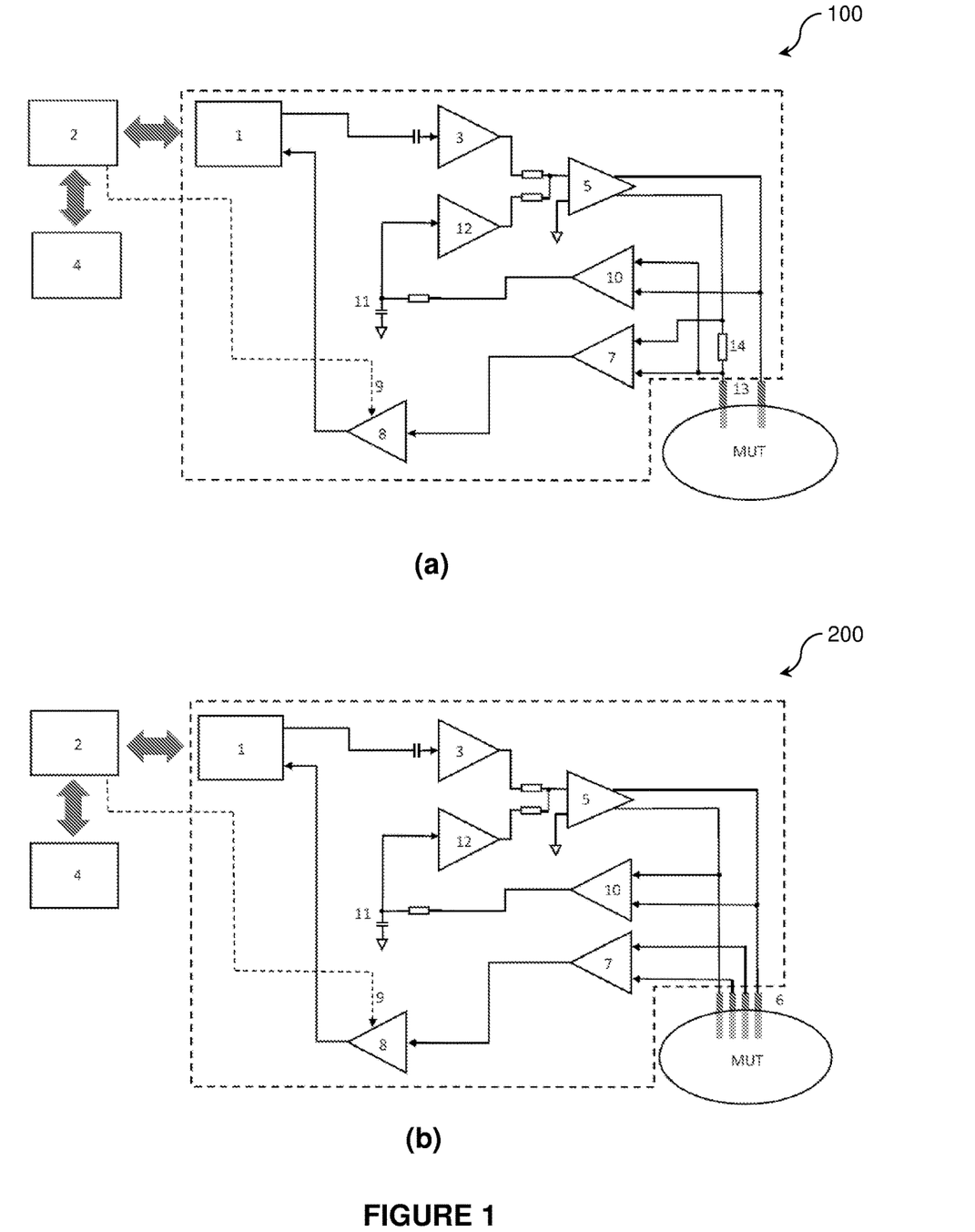
FIG. 1 shows block diagrams of a measurement system that includes an electrical impedance meter (shown in dashed outline) configured for monitoring at least one characteristic property of a multiphase fluid according to a preferred embodiment of the present invention, in which electrodes for immersing in the multiphase fluid are in (a) a two-electrode configuration, and (b) a four-electrode configuration.

FIG. 1(a) shows a block diagram of a measurement system including an electrical impedance meter 100 (shown in dashed outline) configured for use in monitoring a characteristic property of a multiphase fluid according to a preferred embodiment of the present invention.

As will be described in more detail below, the electrical impedance meter 100 is operably connected to a two-electrode measurement cell (13) by way of suitably configured cables, and also operably connected to a microprocessor (2) for processing any signals associated with electrical impedance magnitude measurements made using the cell (13) when a pair of electrodes 13A, 13B associated with the cell (13) are fully immersed in a material under test (MUT).

For the purposes of defining the desirable attributes of the electrical impedance meter 100, the MUT takes the form of a multiphase fluid, which for test purposes, is that of a three phase mixture of bubbles, fine coal particles and water encountered during a coal flotation process.

Referring to FIG. 1(a), the electrical impedance meter 100 includes a commercially available integrated circuit (1) configured as both a signal generating and measuring means to measure the magnitude of an electrical impedance of an external circuit or MUT (Material Under Test) at at least one frequency point selected within a suitable frequency range in response to an excitation signal generated by the integrated circuit (1). The integrated circuit (1) comprises an onboard frequency generator with an output frequency range of between 1 kHz and 120 kHz.

Specifically, this integrated circuit (1) internally generates an excitation signal in the form of an electrical alternating current or voltage and uses a discrete Fourier transform (DFT) algorithm to measure the response of the material under test (MUT) to this excitation signal via an internal analogue to digital convertor (ADC). The DFT algorithm returns the magnitude of the electrical impedance of the MUT to the microprocessor (2).

Programming of control signals for the impedance measuring integrated circuit (1) including the frequency of the excitation signal, range changes for signal processing circuits and communications with external devices and user graphical interfaces are performed by the microprocessor (2).

To enable this electrical impedance meter 100 to be used with the impedance range typically encountered in a coal flotation process as the MUT, external signal conditioning is required. This consists of an AC coupled amplifier (3) to boost or attenuate, as required, the output waveform generated by the impedance measuring integrated circuit (1) and also remove any DC offset present. The signal can then be used to excite the MUT, using constant root mean square (RMS) current excitation produced by a voltage to current amplifier (5).

The output of the voltage to current amplifier (5) is then fed to the two electrodes 13A, 13B of the electrode measurement cell (13).

The electrical response of the two electrode measurement cell (13) is sensed by precision resistor (14) and the voltage across this resistor (14) is fed to a high input impedance differential voltage instrumentation amplifier (7) and a gain selectable amplifier (8). The gain of the gain selectable amplifier (8) is selected automatically by the microprocessor (2) via control signals (9) (represented in FIG. 1(a) by a dotted line). The output of the gain selectable amplifier (8) is then fed to the signal input of the impedance measuring integrated circuit (1).

It is preferable to keep the DC offset across the two electrode measurement cell (13) to be as small as possible to prevent polarisation of the cell (13). This is achieved by measuring the DC component of the excitation signal to the cell (13) by a combination of a high input impedance differential voltage instrumentation amplifier (10) and a low pass filter (11). The near DC component of the excitation signal is then fed back to the voltage to current amplifier (5) via a buffer amplifier (12) to servo control the DC offset across the two electrode measurement cell (13) to be zero.

The resultant impedance magnitude value is communicated to a user via a graphical user interface (4) or to one or more external devices (not shown) by the microprocessor (2) via a communications interface (not shown) configured for two-way communication using a communication protocol that may include a wired communication protocol such as the Ethernet™, or a wireless communication protocol such as Wi-Fi™, Bluetooth™ or the like.

Four-Electrode Configuration

FIG. 1(b) shows another block diagram of the measurement system, this time including a differently configured electrical impedance meter 200 (shown in dashed outline) for use in monitoring a characteristic property of a multiphase fluid according to another preferred embodiment of the present invention.

The electrical impedance meter 200 includes more or less the same components as described above in respect of the first electrical impedance meter 100, but is operably connected to a four-electrode measurement cell (6) by way of suitably configured cables, and thus the internal components of the second electrical impedance meter 200 are configured accordingly.

For the purposes of defining the desirable attributes of the electrical impedance meter 200, the MUT employed for test purposes is that of a water/magnetite slurry as the multiphase fluid.

Specifically, and with reference to FIG. 1(b), the output of the voltage to current amplifier (5) of the electrical impedance meter 200 is fed to an outer pair of electrodes 6A, 6B of the four electrode measurement cell (6).

The voltage present across an inner pair of electrodes 6C, 6D of the four electrode measurement cell (6) is measured by the high input impedance differential voltage instrumentation amplifier (7) and the gain selectable amplifier (8). The gain of the gain selectable amplifier (8) is again selected automatically by the microprocessor (2) via control signals (9) (shown as a dotted line), and the output of the gain selectable amplifier (8) is fed to the signal input of the impedance measuring integrated circuit (1).

Again, the resultant impedance magnitude value is communicated to a user via the graphical user interface (4) or to one or more external devices (not shown) by the microprocessor (2) via a communications interface (not shown) configured for two-way communication using a communication protocol that may include a wired communication protocol such as the Ethernet™ or a wireless communication protocol such as Wi-Fi™, Bluetooth™ or the like.

Results

Now that the internal componentry and workings of the electrical impedance meters 100, 200 have been described; the following provides a description of a basic method 300 for monitoring at least one characteristic property of a multiphase fluid together with a description of each of the use of these electrical impedance meters 100, 200 for the purpose of monitoring a characteristic property of a particular multiphase fluid.

Method

Figure 7:
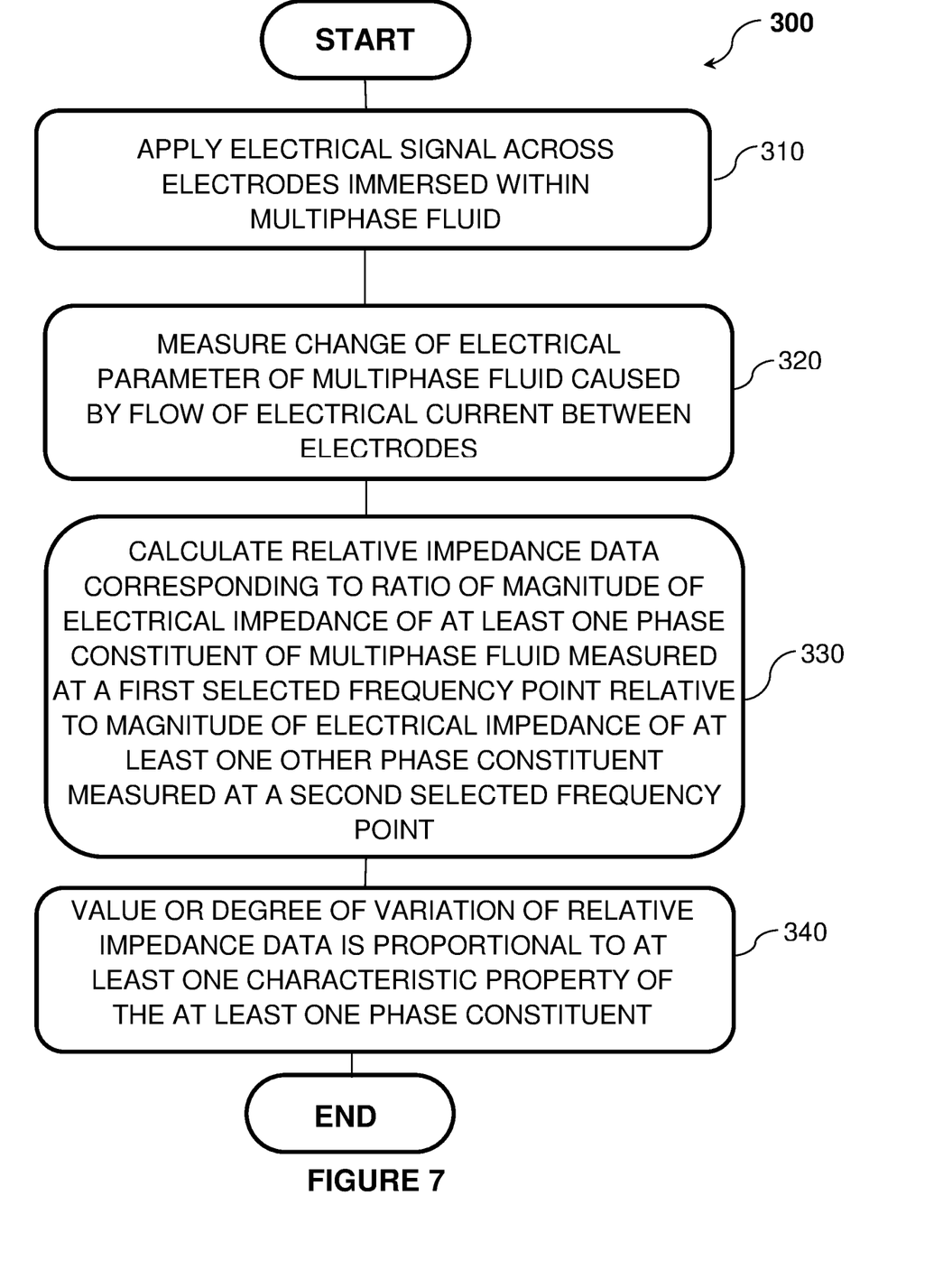
FIG. 7 shows a flow diagram outlining the basic steps of a method for monitoring at least one characteristic property of a multiphase fluid according to another preferred embodiment of the present invention.

FIG. 7 shows a flow diagram outlining the basic steps of a method 300 for monitoring at least one characteristic property of a multiphase fluid using one of the electrical impedance meters 100, 200 described in more detail below.

According to a first step 310, one or two pairs of laterally spaced apart electrodes, operably connected to a corresponding one of the two electrical impedance meters 100, 200, are first immersed into a multiphase fluid, and then an electrical signal, preferably an AC signal of predetermined amplitude, is applied across the pair or the first pair, of electrodes.

According to a second step 320, an electrical parameter, typically voltage is measured or sensed across the pair or second pair, of electrodes, in which the voltage is caused to change in response to a flow of electrical current between the pair or first pair of electrodes.

According to a third step 330, the microprocessor (2) is used to calculate a relative impedance that corresponds to a ratio of the magnitude of an electrical impedance of at least one phase constituent in the multiphase fluid measured at one selected frequency point relative to the magnitude of an electrical impedance of at least one other phase constituent of the multiphase fluid. For the purpose of describing the method 300 in more detail, the multiphase fluid is a water/coal or mineral slurry, where the phase constituent of interest is a froth phase of the water/coal or mineral slurry, the other phase constituent is water, used as a suitable point of reference. For the purposes of density measurement, the multiphase fluid consists of a water/magnetite slurry where the phase constituent of interest is the solid magnetite phase.

According to a fourth step 340, the calculated value or degree of variation of the relative impedance data is then proportionally correlated with a characteristic property of the phase constituent of interest, which in the case of the froth phase is stability, while in the case of magnetite, is a medium density thereof.

Now that the basic method 300 has been described, the following provides a more detailed description of the use of each of the two electrical impedance meters 100, 200 for monitoring processes in the coal industry.

On-Line Monitoring of a Froth Flotation Process

The measurement of electrical impedance magnitude for the on-line monitoring of certain characteristic properties of a froth flotation process can be made using the simple electrical impedance meter 100 (see FIG. 1(*a*)) described above at at least one frequency point selected from within the range of 20 kHz to 120 kHz.

Figure 2:
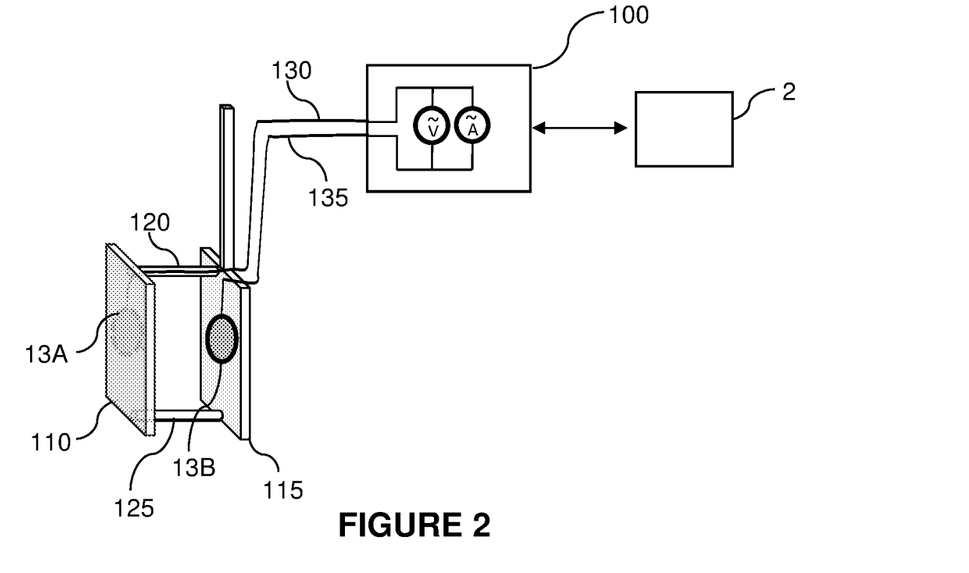
FIG. 2 shows a schematic diagram of the electrical impedance meter of FIG. 1(a) configured for monitoring characteristic properties of a froth phase in a froth flotation process.

Electrical impedance magnitude in a froth phase should be measured preferably using the electrical impedance meter 100 with the two electrode configuration as shown in FIG. 2 and at a location close to an overflow weir of a froth flotation cell (not shown).

In a preferred form, and as shown schematically in FIG. 2, each electrode of the pair of electrodes 13A (shown in dashed outline), 13B of the cell (13) has a generally circular shape, with a diameter of between about 10 mm to about 20 mm. Each of the two electrodes 13A, 13B is mounted to a corresponding non-conductive plate 110, 115. The two non-conductive plates 110, 115 are arranged in a laterally spaced apart arrangement, separated by a pair of elongate spacers 120, 125 connected at respective top and bottom edge portions of each of the two non-conductive plates 110, 115.

The distance between the two electrodes 13A, 13B is between about 80 mm to about 150 mm. The size of the electrodes 13A, 13B and the corresponding distance between them have been selected so that the electrical impedance magnitude falls within a suitable range under conditions commonly encountered at coal preparation plants. The position of the electrodes 13A, 13B is about 30 mm to 50 mm below the overflow weir and about 200 mm to 400 mm away from the overflow weir or any other metal structure.

The two circular-shaped pair of electrodes 13A, 13B are used for applying constant voltage or current AC signals to the multiphase fluid and measuring the resultant electrical current or voltage produced following contact with the phase constituents within the multiphase fluid. The electrodes 13A, 13B are made from 306 stainless steel coated with a noble metal selected from the group consisting of copper, silver, gold, palladium and platinum, so as to render the electrode surface chemically inert. In a preferred form, the noble metal of choice is gold. The non-conductive plates 110, 115 are each manufactured from standard printing circuit board (PCB) while the top and bottom spacers 120, 125 are manufactured from polyvinylchloride (PVC). It will be appreciated by persons of ordinary skill in the art that both of these materials are good insulators for preventing electrical current leakage. Coaxial cables 130, 135 encased in a polyurethane (PU) sleeve are used to connect the pair of electrodes 13A, 13B to the signal generating means of the electrical impedance meter 100.

The inventors have found that the length of the cables 130, 135 is largely determined by the dimensions of the electrodes 13A, 13B to which the cables 130, 135 are attached, and more particularly to the area of the electrode surface. For instance, for a given amplitude of AC current, it is possible to employ cables 130, 135 having a length that falls within a range of about 0.5 m up to about 2.0 m, where the electrode (for AC current driving) has a surface area of around 2.0 $cm^2$. For electrodes having a smaller surface area, say around 0.25 $cm^2$, the cables 130, 135 are required to have a length of less than 1.0 m. For at least the practical applications described hereinafter, the inventors have found that a cable length of less than 2.0 m is an acceptable threshold to avoid the influence of cable capacitance.

The change of flotation performance caused by variations in operating conditions can be monitored by taking measurements of the electrical impedance magnitude (ohms) in the froth phase at at least one frequency point selected from within the range of 20 kHz to 120 kHz. As described above, this frequency range (20 kHz to 120 kHz) has been determined as a result of unexpectedly finding the frequency of 120 kHz to be a suitable upper limit.

The froth stability can be quantitatively monitored by measuring the relative impedance at these selected frequencies as a function of time (s) for a given period of time.

Figure 3:
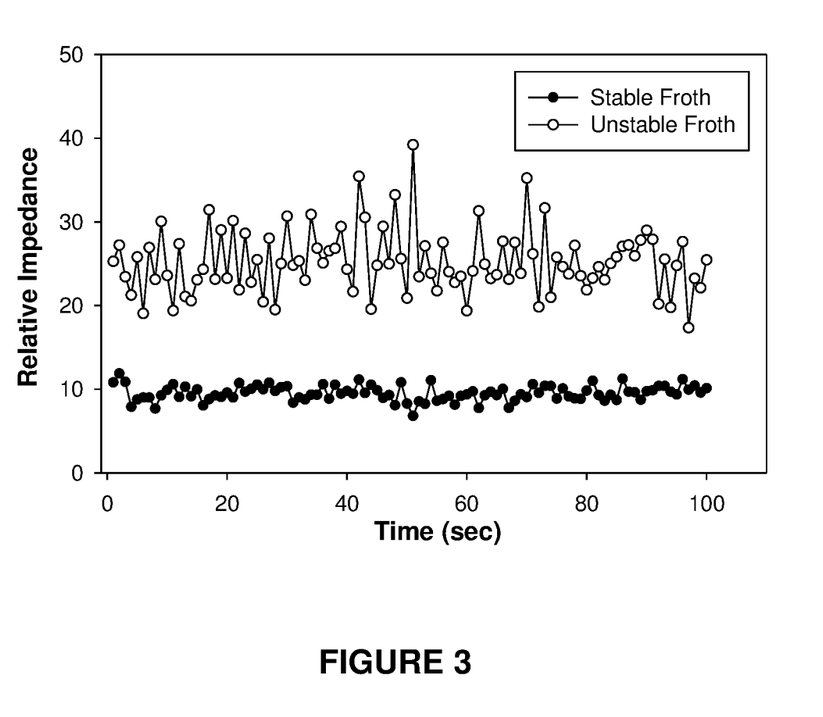
FIG. 3 shows plots of relative impedance of a froth phase (obtained from experimentation using a Microcel™ flotation column as a froth flotation cell) as a function of time (s) for a coal flotation process with two different froth stabilities, in which the electrical impedance magnitude measurements were obtained at a frequency of 65 kHz using the electrical impedance meter with the two electrode configuration of FIG. 2.

FIG. 3 shows a plot showing variations of the relative impedance of a froth phase constituent of a multiphase fluid consisting of a three phase mixture of bubbles, fine coal particles and water (obtained from experimentation using a Microcel™ flotation column as the froth flotation cell) as a function of time(s) for a coal flotation process with two different froth stabilities. Specifically, the electrical impedance magnitude (ohms) measurements of the froth phase constituent and the corresponding liquid phase constituent of the multiphase fluid were monitored using the electrical impedance meter 100 of FIG. 2 at a frequency of 65 kHz over a period of 100 seconds. The relative impedance for the froth stability is then calculated by dividing the electrical impedance magnitude (ohms) of the froth phase constituent by the electrical impedance magnitude (ohms) of the liquid phase constituent of the multiphase fluid.

As shown in FIG. 3, two different relative impedance (ohms) measurements were obtained for the froth phase with two different stabilities. For instance, the measurement data labelled "unstable froth" was measured in a froth phase with low stability at the inner weir of the Microcel™ flotation column, while the measurement data labelled "stable froth" was measured in a froth phase with a reasonable stability at the outer weir of the Microcel™ flotation column. The relative impedance can therefore provide an immediate indication as to how far the froth phase is from the optimal conditions.

Figure 4:
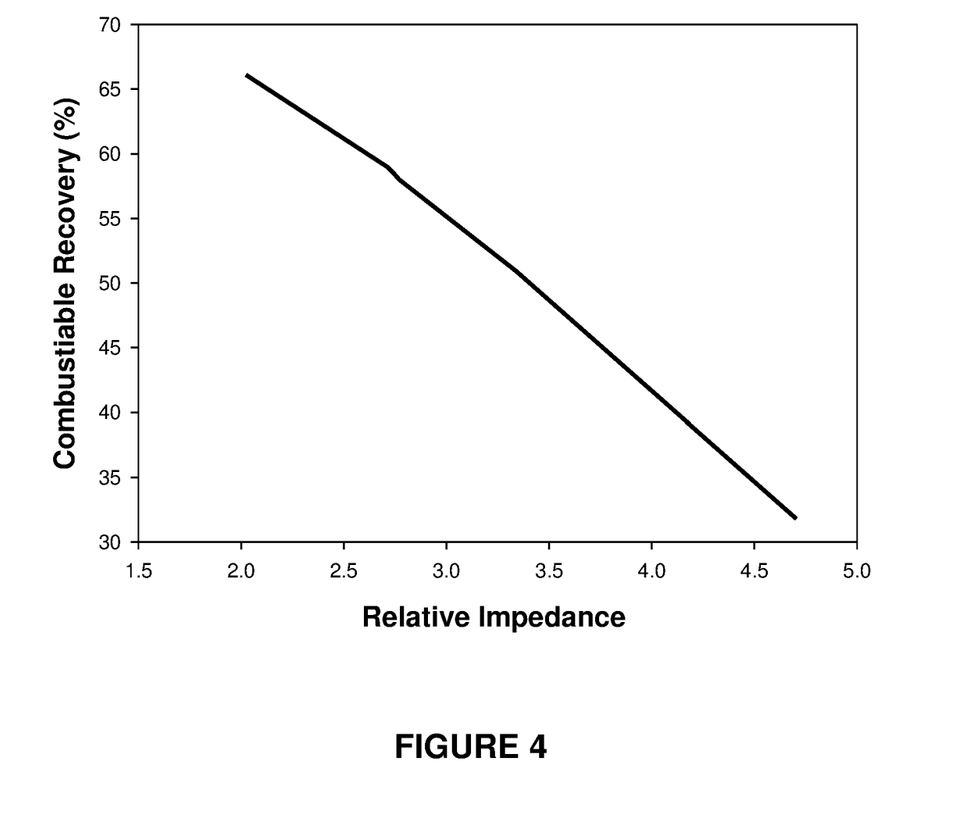
FIG. 4 shows a plot of combustible recovery (%) versus relative impedance of a froth phase (obtained from experimentation using a Jameson cell as a froth flotation cell) for a coal flotation process with a suitable froth stability, in which the electrical impedance magnitude measurements were obtained at a frequency of 65 kHz using the electrical impedance meter with the two electrode configuration of FIG. 2.

The ratio of standard deviation to the mean value of the relative impedance variation in 100 seconds is defined as the stability ratio (SR) to quantify the froth stability. FIG. 4 shows a plot of combustible recovery (%) versus relative impedance of a froth phase constituent (obtained from experimentation using a Jameson cell as the froth flotation cell) for a coal flotation process with a suitable froth stability. Specifically, the electrical impedance magnitude (ohms) measurements of the froth phase constituent and the other phase constituent, that being the corresponding liquid phase constituent of this particular multiphase fluid, were monitored using the electrical impedance meter 100 at the same frequency of 65 kHz over a short period of time (say, 10 seconds). Again, the relative impedance for the froth stability is calculated by dividing the electrical impedance magnitude (ohms) of the froth phase constituent by the electrical impedance magnitude (ohms) of the liquid phase constituent of the multiphase fluid.

Based on the results shown in FIG. 4, it is observed that the relative impedance of the froth phase constituent can be linearly or non-linearly correlated with the flotation performance of the froth phase. That is, the relative impedance of the froth phase constituent is proportional to the combustible recovery (%). Under a suitable froth stability (for example, when the stability ratio (SR) is between 8 to 12%), the inventors have found that the lower the relative impedance value at a selected frequency point in the range of 20 kHz to 120 kHz, the better the combustible recovery (%) or flotation yield.

For cases with an unstable froth structure (for example, when the stability ratio is higher than 15%), the flotation performance of the froth phase is invariably poor and the relative impedance value of the froth phase will not be correlated with the yield. By contrast, when the froth structure is too stable (for example, when the stability ratio (SR) is less than 5%), the ash content in the concentrate is high due to high levels of fines and water content in the froth phase.

In practical applications of the electrical impedance measurement based technique for monitoring froth flotation processes, the inventors have found that the first step should involve stabilising the froth phase with the help of the measurement of the stability ratio (SR). Once an adequately stable froth phase has been achieved, the relative impedance for the froth phase can be reduced to a value close to 2 but not less than 2 by adjusting operation conditions (such as feed solids content, frother dosage, collector dosage, froth depth, aeration rate. If the value of the relative impedance is less than 2, the froth phase would be overloaded or have too low a froth depth, leading to poor performance.

On-Line Monitoring of a Density of Dense Medium

Figure 5:
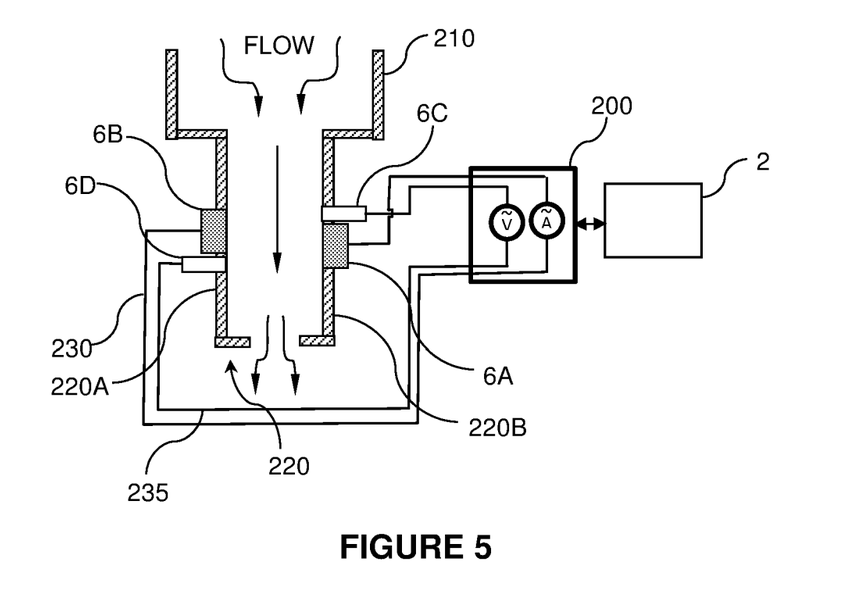
FIG. 5 shows a schematic diagram of the electrical impedance meter of FIG. 1(b) configured for monitoring a density of a dense medium in an electrode assembly installed within a flow guide for a dense medium process stream.

As shown in FIG. 5, measurement of the magnitude of electrical impedance for the on-line monitoring of the density of a dense medium comprised of an aqueous slurry of fine magnetite is conducted using the simple electrical impedance meter 200 with the four electrode configuration described above (see FIG. 1(b)) installed as an electrode assembly within a flow guide for a dense medium process stream.

Specifically, and with reference to FIG. 5, the flow guide comprises a generally rectangular shaped collection tray 210 into which the water/magnetite slurry is received. The collection tray 210 comprises an aperture in a bottom portion thereof to allow the water/magnetite slurry to flow from the collection tray 210 into a generally rectangular shaped hollow down-flow duct 220 connected to the bottom portion of the collection tray 210. Additionally, a wedge-wire screen (not shown) coated with tungsten-carbide is installed at the top of the collection tray 210 to prevent the influx of any large particles that could ultimately block the flow duct 220.

The two pairs of electrodes 6A, 6B and 6C, 6D are inserted into a corresponding wall 220A, 220B of the down-flow duct 220 such that each pair of electrodes 6A, 6B and 6C, 6D has one electrode (6A, 6C) of the pair mounted on an opposite side to the other electrode (6B, 6D) of the pair. In this arrangement, the surface of each of the four electrodes 6A, 6B and 6C, 6D can be exposed to the water/magnetite slurry as it passes down through the down-flow duct 220 in the direction of flow, as indicated by the arrows shown in FIG. 5.

In a preferred arrangement, the inner pair of electrodes 6C, 6D is co-located with the outer pair of electrodes 6A, 6B in which the smaller inner electrodes 6C, 6D are mounted to a corresponding wall 220A, 220B of the down-flow duct 220 such that the inner electrodes 6C, 6D are located within the central aperture of the corresponding larger ring-shaped outer electrode 6A, 6B. It will be appreciated by those persons of ordinary skill in the art that the inner pair of electrodes 6C, 6D is electrically insulated from the outer pair of electrodes 6A, 6B.

All four electrodes 6A, 6B and 6C, 6D are manufactured from a suitable metal such as 316 stainless steel, copper or an electrically conductive metal alloy thereof. Each electrode of the outer pair of electrodes 6A, 6B can take any reasonable form. In a preferred embodiment, these two electrodes 6A, 6B are either circular or rectangular in shape, and have an aperture extending substantially through a central portion of the electrode 6A, 6B. The shape of each electrode of the inner pair of electrodes 6C, 6D for sensing AC voltage can also take any reasonable form. However, in a preferred form, these two electrodes 6C, 6D are generally circular in shape. The inventors have found that the inner pair of electrodes 6C, 6D for sensing AC voltage should be located very close to the outer pair of electrodes 6A, 6B.

The collection tray 210 and flow duct 220 of the flow guide are ideally manufactured from a non-conducting material such as, for example, polyvinylchloride (PVC) or a suitable electrically insulating ceramic for preventing any leakage of electrical current. Coaxial cables 230, 235 used for connecting the corresponding electrodes 6A, 6B and 6C, 6D to the signal generating means of the electrical impedance meter 200, are encased in a polyurethane (PU) sleeve. Again, for the same reasons as given above, the coaxial cables 230, 235 employed in this application have lengths of less than 2.0 m.

For monitoring the density of a dense medium, the inventors have found that the size of the surface areas of the two pairs of electrodes 6A, 6B and 6C, 6D and the corresponding gap between each of these pairs of electrodes 6A, 6B and 6C, 6D need to be carefully selected so that the electrical impedance magnitude of process water is in the range of 10 to 1000 ohms under conditions commonly encountered at coal preparation plants.

Indeed, as schematically represented in FIG. 5, the contact surface area of each of the outer pair of electrodes 6A, 6B for applying AC current at a constant amplitude to the multiphase fluid is at least twofold greater than the surface area of each of the corresponding inner pair of electrodes 6C, 6D configured for sensing AC voltage. More specifically, the surface area of each of the outer pair of electrodes 6A, 6B is in the range of about 0.25 $cm^2$ to about 25 $cm^2$, and the surface area of each of the inner pair of electrodes 6C, 6D should be less than half of the size of the surface area of the outer pair of electrodes 6A, 6B. The gap between each pair of the two pairs of electrodes 6A, 6B and 6C, 6D is in the range of about 10 mm to about 100 mm.

Since voltage measurement systems always have very high input impedance, any electrical current passing through an interface region immediately next to the inner pair of voltage sensing electrodes 6C, 6D is taken to be negligible. When no electrical current is passing between this pair of electrodes 6C, 6D, the measured voltage is effectively the potential drop in the bulk phase of the water/magnetite slurry.

The inventors have observed that if the surface area of the outer pair of electrodes 6A, 6B is relatively large and each electrode of the inner pair of voltage sensing electrodes 6C, 6D is located within the central aperture of a corresponding one of the outer pair of electrodes 6A, 6B, then the current passing through the bulk phase (that being the liquid phase) between the voltage sensing electrodes 6C, 6D is basically the same as the applied current. Since both the voltage and the electrical current measured by the electrical impedance meter 200 are associated mainly with the bulk phase, the calculated electrical impedance magnitude would be dominated by the electrical impedance magnitude of the bulk phase.

Here, the inventors have found that the density of a dense medium such as a water/magnetite slurry or volumetric fraction of magnetite in a magnetite/water slurry can be monitored by using the electrical impedance meter 200 to obtain electrical impedance magnitude measurements (ohms) at two frequency points. One of the electrical impedance magnitude measurements is made at a frequency point (hereinafter, termed the "characteristic frequency point") at which the measured electrical impedance magnitude is not influenced by the medium density of a magnetite/water slurry (under the same temperature and water conductivity) for a given pair of electrodes 6A, 6B and 6C, 6D and the corresponding length of the coaxial cables 230, 235 connecting these electrodes 6A, 6B and 6C, 6D to the electrical impedance meter 200.

Similar to the situation described above in respect of measuring electrical impedance magnitude measurements for the phase constituents of a multiphase fluid associated with the froth flotation process, the inventors have found that these electrical impedance magnitude measurements are again best obtained at frequency points selected in the narrow range of 20 kHz to 120 kHz, whereby the characteristic frequency point, which is best determined by experimentation for a given electrode assembly and the length of coaxial cable based on the operating conditions of a particular coal preparation plant situation, defines the upper limit (120 Hz) of the frequency range, while the second frequency point, which defines the lower limit, is selected on the basis that it must be less than the characteristic frequency point, but still be of a suitable frequency to ensure that the electrical impedance magnitude measurements when normalized to the characteristic frequency point (100 kHz) define a linear region.

With regards to the characteristic frequency point, the inventors found that by measuring the electrical impedance magnitude of a water/magnetite slurry containing magnetite with different medium relative densities (ranging from 1.12 RD to 1.85 RD) at number of frequency points over the frequency range of 10 kHz to 120 kHz using an electrical impedance meter, plots of the obtained data of impedance magnitude versus logarithm of the frequency for each medium density will intersect at the same frequency point. This frequency point is the characteristic frequency.

With regards then to the second frequency point, the inventors have identified that for the configuration of the electrodes 6A, 6B, 6C and 6D used and the corresponding lengths (less than 2.0 m) of the coaxial cables 230, 235 connecting these electrodes to the electrical impedance meter 200 of the measurement system shown in FIG. 5, the second frequency point (lower limit) can be selected from within the range of 20 kHz to 80 kHz. That is, the lower value (20 kHz) corresponds to the limit of the linear portion or slope produced by this measurement system, and the higher value (80 kHz) corresponds to a frequency that is sufficiently distanced from the characteristic frequency point so as to allow enough data points to linearize the data accurately.

Figure 6:
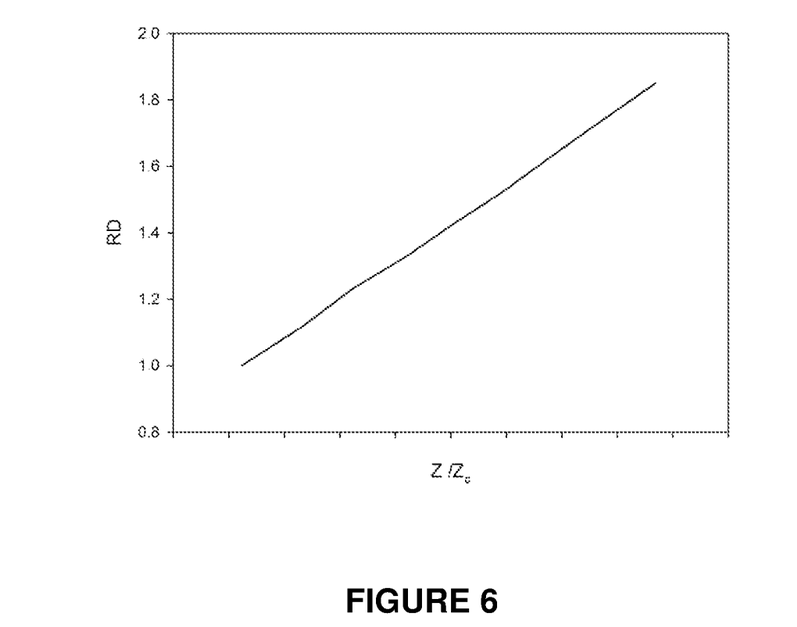
FIG. 6 shows a plot of relative density (RD) of the dense medium (i.e. a water/magnetite slurry) versus a ratio ($Z/Z_c$) of a medium impedance magnitude (Z) measured at a selected frequency of 54 kHz to medium impedance magnitude ($Z_c$) measured at a characteristic frequency point (100 kHz), in which the electrical impedance magnitude measurements were obtained using the electrical impedance meter with the four electrode configuration of FIG. 5.

FIG. 6 shows a plot of relative density (RD) of the dense medium of a water/magnetite slurry versus a ratio ($Z/Z_c$) of the medium impedance magnitude (Z) measured at a selected frequency of 54 kHz to the medium impedance magnitude ($Z_c$) measured at a characteristic frequency point, determined to be 100 kHz for the electrode assembly and cable length used in the experiments. As shown by the slope in this figure, the medium or relative density (RD) of the magnetite within the magnetite/water slurry is linearly correlated with the $Z/Z_c$ ratio.

The electrical impedance meter 200 thus provides an impedance magnitude measurement that when normalised to the impedance magnitude at 100 kHz (for the presently defined electrode and cable configuration) is proportional to the volumetric fraction of magnetite presence and thus the relative density (RD). Therefore, the ratio of $Z/Z_c$ is proportional to the relative density (RD) and volumetric fraction of magnetite within the water/magnetite slurry.

Here, the inventors have also recognised that the characteristic frequency point can increase with corresponding increases in: (i) the magnitude of the electrical impedance resulting from the surface contact of a dense medium such as magnetite suspended within a water/magnetite slurry with the surfaces of the four electrodes 6A, 6B and 6C, 6D, and (ii) the length of the connecting coaxial cable 230, 235; and can decrease with (iii) a corresponding decrease in the surface contact impedance measured between the pair of voltage sensing electrodes 6C, 6D.

Thus, if the configuration of the electrodes or cable lengths (as presently defined herein) is changed, or even if the noise produced by the electrical impedance meter 200 is different, then it will be appreciated by those persons of ordinary skill in the relevant art that another sets of experiments will need to be carried out using an electrical impedance meter to determine the characteristic frequency point.

In summary, the inventors have found that by operating the electrical impedance meter 200 at two selected frequency points within this narrow range (20 kHz to 120 kHz), rather than sweeping a wide range of frequencies (10 Hz to 1 MHz), it is possible to obtain repeat measurements quickly over a much shorter timeframe than that taken to scan the frequency range of 10 Hz to 1 MHz using an electrical impedance spectrometer.

A distinct advantage of the method of this particular embodiment is that electrical impedance magnitude measurements (ohms) can be obtained and repeated quickly over a very short period of time, thereby leading to more accurate data being obtained for fast flowing multiphase fluids such as slurries within significantly shorter, near-real time, timeframes as compared with conventional on-line monitoring techniques.

REFERENCES

Hu, S. and Firth, B., (2002), "*Process Monitoring using Electrical Impedance Spectroscopy*", ACARP Project C9045 Report.
Hu, S. and Firth, B., (2005), "*Process Monitoring for DMC using EIS Plant-Based Trials*", ACARP Project C9045-Stage 2 Report.
Hu, S. and Firth, B., (2007), "*On-Line Monitoring and Control of DMC Separation Density and Efficiency*", ACARP Project C13058 Final Report.

Definitions

Whenever a range is given in the specification, for example, a temperature range, a time range, or concentration range, all intermediate ranges and subranges, as well as all individual values included in the ranges given are intended to be included in the disclosure. It will be understood that any subranges or individual values in a range or subrange that are included in the description herein can be excluded from the claims herein.

All definitions, as defined and used herein, should be understood to control over dictionary definitions, definitions in documents incorporated by reference, and/or ordinary meanings of the defined terms.

Throughout this application, the term "about" is used to indicate that a value includes the inherent variation of error for the device, the method being employed to determine the value, or the variation that exists among the study subjects.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Spatially relative terms, such as "inner," "outer," "beneath," "below," "lower," "above," "upper," and the like, may be used herein for ease of description to describe one element or feature's relationship to another element(s) or feature(s) as illustrated in the Figures. Spatially relative terms may be intended to encompass different orientations of the device in use or operation in addition to the orientation depicted in the Figures.

While the invention has been described in conjunction with a limited number of embodiments, it will be appreciated by those skilled in the art that many alternatives, modifications and variations in light of the foregoing description are possible. Accordingly, the present invention is intended to embrace all such alternatives, modifications and variations as may fall within the spirit and scope of the invention as disclosed.

Where the terms "comprise", "comprises", "comprised" or "comprising" are used in this specification (including the claims) they are to be interpreted as specifying the presence of the stated features, integers, steps or components, but not precluding the presence of one or more other features, integers, steps or components, or group thereof.

The invention claimed is:

1. A system for monitoring at least one characteristic property of a multiphase fluid, the system comprising:
    at least one pair of electrodes immersed within a multiphase fluid and defining a sample region located therebetween;
    a signal generator configured to generate and apply an electrical signal across the at least one pair of electrodes;
    a measuring device configured to measure an electrical parameter of the multiphase fluid in the sample region, the measured electrical parameter being caused to change in response to a flow of electrical current between the at least one pair of electrodes; and
    a processor configured to calculate relative impedance data corresponding to a ratio of a magnitude of an electrical impedance of at least one phase constituent of the multiphase fluid within the sample region measured at a first selected frequency point relative to a magnitude of an electrical impedance of at least one other phase constituent measured at a second selected frequency point,
    wherein the value or degree of variation of the relative impedance data is proportional to at least one characteristic property of the at least one phase constituent of the multiphase fluid,
    wherein the signal generator is configured to generate an electrical signal having a frequency that falls within a range of between 15 kHz and 120 kHz.

2. A system according to claim 1, wherein the electrical parameter of the multiphase fluid in the sample region is measured at a plurality of time intervals.

3. A system according to claim 1, wherein the electrical signal applied across the at least one pair of electrodes is an alternating electrical signal.

4. A system according to claim 1, wherein the multiphase fluid is a water/coal or mineral slurry such that the at least one phase constituent is a froth phase constituent and the at least one other phase constituent is water, and wherein the at least one characteristic property of the froth phase constituent is stability.

5. A system according to claim 4, wherein the each of the first and second frequency points is selected from the range of 20 kHz to 120 kHz.

6. A system according to claim 4, wherein the electrodes of the at least one pair of electrodes are laterally spaced apart by a distance of between about 80 mm to about 150 mm.

7. A system according to claim 1, wherein the at least one pair of electrodes includes at least two pairs of electrodes, and wherein a first pair of the at least two pairs of electrodes is configured to apply an electrical current to the multiphase fluid and a second pair of the at least two pairs of electrodes is configured to measure the corresponding voltage produced by the multiphase fluid as a result of the electrical current.

8. A system according to claim 7, wherein the multiphase fluid is a water/magnetite slurry such that the at least one phase constituent is magnetite and the at least one other phase constituent is water, and wherein the at least one characteristic property of the magnetite is a medium density.

9. A system according to claim 7, wherein the first pair of the at least two pairs of electrodes is electrically isolated from the second pair of the at least two pairs of electrodes.

10. A system according to claim 7, wherein the electrodes of each of the first pair and the second pair of electrodes are laterally spaced apart by a distance of between about 10 mm to about 100 mm.

11. A system according to claim 7, wherein each of the first and second frequency points is selected from the range of 20 kHz to 120 kHz.

12. A system according to claim 11, wherein the first selected frequency point defines an upper limit that is determined based on selected parameters of the at least two pairs of electrodes and corresponding cables electrically connecting the at least two pairs of electrodes to the signal generating means generator, and wherein the second selected frequency point defines a lower limit that is less than the first selected frequency point, and which falls within a frequency range of between 20 kHz and 80 kHz.

13. A method for monitoring at least one characteristic property of a multiphase fluid, including the steps of:
  applying an electrical signal across at least one pair of electrodes immersed within a multiphase fluid and defining a sample region substantially therebetween;
  measuring an electrical parameter of the multiphase fluid in the sample region, the measured electrical parameter being caused to change in response to a flow of electrical current between the at least one pair of electrodes; and
  calculating relative impedance data corresponding to a ratio of a magnitude of an electrical impedance of at least one phase constituent of the multiphase fluid within the sample region measured at a first selected frequency point relative to a magnitude of an electrical impedance of at least one other phase constituent measured at a second selected frequency point,
  wherein the value or degree of variation of the relative impedance data is proportional to at least one characteristic property of the at least one phase constituent of the multiphase fluid,
  wherein each of the first and second frequency points is selected from the range of 20 kHz to 120 KHz.

14. A method according to claim 13, wherein the electrical parameter of the multiphase fluid in the sample region is measured at a plurality of time intervals.

15. A method according to claim 13, wherein the electrical signal applied across the at least one pair of electrodes is an alternating electrical signal.

16. A method according to claim 13, wherein the multiphase fluid is a water/coal or mineral slurry such that the at least one phase constituent is a froth phase constituent and the at least one other phase constituent is water, and wherein the at least one characteristic property of the froth phase constituent is stability.

17. A method according to claim 13, wherein the first selected frequency point defines an upper limit that is determined based on selected parameters of the at least two pairs of electrodes and corresponding cables electrically connecting the at least two pairs of electrodes to a signal generator, and wherein the second selected frequency point defines a lower limit that is less than the first selected frequency point, and which falls within a frequency range of between 20 kHz and 80 kHz.

18. A method according to claim 13, wherein the at least one pair of electrodes includes at least two pairs of electrodes, and wherein a first pair of the at least two pairs of electrodes is configured to apply an electrical current to the multiphase fluid and a second pair of the at least two pairs of electrodes is configured to measure the corresponding voltage produced by the multiphase fluid as a result of the electrical current.

19. A method according to claim 18, wherein the multiphase fluid is a water/magnetite slurry such that the at least one phase constituent is magnetite and the at least one other phase constituent is water, and wherein the at least one characteristic property of the magnetite is a medium density.

20. A method according to claim 18, wherein the electrodes of each of the first pair and the second pair of electrodes are laterally spaced apart by a distance of between about 10 mm to about 100 mm.

* * * * *